Sept. 22, 1959 G. C. DION 2,905,478
SIMULATED ANIMAL TRICYCLE ADAPTER MECHANISM
Filed Jan. 16, 1959

INVENTOR.
GEORGE C. DION.
BY Thomas J. P. O'Brien,
his ATTORNEY

United States Patent Office 2,905,478
Patented Sept. 22, 1959

2,905,478

SIMULATED ANIMAL TRICYCLE ADAPTER MECHANISM

George C. Dion, Coraopolis, Pa.

Application January 16, 1959, Serial No. 787,275

4 Claims. (Cl. 280—1.188)

This invention relates in general to an educational device in the form of an adapter mechanism for converting at will, by unskilled persons, a three wheeled velocipede into a simulation of a steerable horizontally disposed vertebrate animal, and more particularly to an adapter mechanism in the form of a simulated horse for the seat and steering mechanism, that can be easily mounted on tricycles interchangeably with a conventional handle bar and its steering post and a conventional seat and its seat post.

More specifically, the invention provides an adapter mechanism for such purpose in the form of a downwardly open two part hollow shell, one part of which is in simulation of the portion of a horse from its shoulders down, and the other part of which is in simulation of the neck and head of the horse, with the base of the neck portion adapted to be rotated relative to the shoulders of the other part for steering of the third wheel of a velocipede when the other part is firmly attached to the frame of the velocipede in a manner to cover the frame and at the same time serve as a riding seat and steering mechanism for a child under the age of reason, that is, one less than seven years of age. The neck is provided in its hollow interior with a horizontal cross-bar, seated in the sides of the neck portion of the shell, and a vertical steering post is centrally attached to the cross-bar so as to extend down into the hollow part of the shoulders of the other part of the adapter mechanism, for insertion of the steering post in the socket for the steering post on the frame of the vehicle. The other part of the shell is provided with a horizontal cross-bar seated in the body portion of the shell to the rear of the shoulder portion and with clamps on this cross-bar for clamping to a part of the forward portion of the vehicle frame which is just to the rear of its steering post column. A like horizontal cross-bar is seated in the body portion of the shell in the groin portion and is provided with clamps for attachment to a forwardly extending seat carrying horizontal bar which is also secured to a depending seat post, for attachment in the seat post receptacle at the rear of the frame of a conventional tricycle.

Preferably the seat post is provided with two parallel horizontal seats carrying bars to prevent turning or slipping of the adapter on the frame. The region of the shell between the forward and rear cross bars is provided with a saddle area and the head is provided with reins for seating and steering by a child when seated in the saddle area. This latter area is so disposed as to have the feet of a child readily engageable with pedals on the third wheel.

Advantages of this adapter mechanism are that it draws on the native instincts of children under the age of seven to naturally and willingly mount and steer without fear, compunction or compulsion.

This adapter mechanism is readily mounted by parents and children on a tricycle interchangeably with the conventional steering and seating post mechanisms of conventional tricycles without any special skill or aptitude or instruction, and in use it lends itself to development of character, confidence and coordination by children under the age of reason. A child thus becomes a willing and ecstatic user of conventional three wheel velocipedes without requiring constant attendance of others while in play.

The article is simple and inexpensive to construct, is long lasting, and requires no assembly and disassembly of the component parts in converting a tricycle from the conventional to the symbolic and vice-versa.

In addition to the general objects recited above, the invention has for further objects such other improvements and advantages in construction and operation as may be found to obtain in the structure and device as hereinafter shown, described and claimed.

Referring to the drawings.

Figure 1:
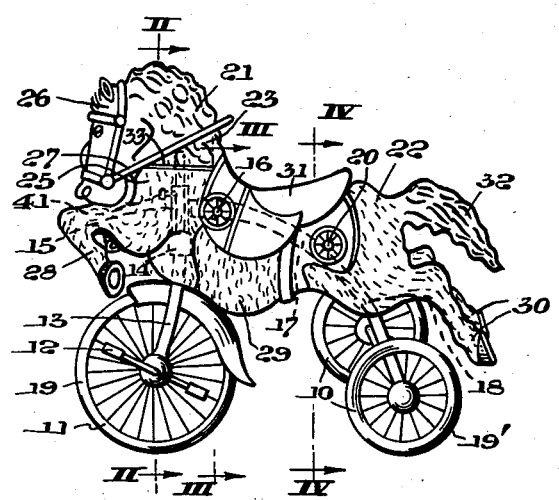
Figure 1 is a side elevational view of the adapter mechanism installed on a conventional tricycle in lieu of its conventional handle bars and seating arrangement.

As shown, the vehicle is of the conventional three-wheel type having a pair of rear wheels 10 and a centrally disposed larger front steering wheel 11 with pedals 12 for rotating the steering wheel forwardly and backwardly. The front wheel 11 is mounted in the usual manner in the forks 13 which are seated in a socket 14 in the steering column 15 at the front upper end of the single bar 16 of the frame 17. The single bar 16 descends to a fork or side branches 18 attached to an axle rod having the rear wheels 19 mounted on the axle ends of the rod. As conventional, just above the branches 18, the frame bar 16 is provided with a receptacle in the form of aligned openings 20 for insertion of a seating post and with a set screw 42 for holding the post in adjusted position in the receptacle 20 relative to the bar 16. The steering columns 15 are constituted of the usual mechanism in the socket 14 for reception of the steering post of a conventional handle bar system, which is held in adjusted position by a set screw 41.

In accordance with the present invention, the adapter mechanism for converting the conventional tricycle to a simulation of a horse or other form of steerable horizontally disposed vertebrate animal comprises a two part hollow shell 21, 22, which lends itself to manufacture in manners and with materials conventional for like toys, dolls, amusement and other devices suitable for the educational environment of children under the age of reason, i.e., seven years of age, who are in their formative stages and whose senses and instinct for coordination have not yet been fully developed.

The shell part 21 comprises a downwardly open portion 23 in the form of the neck of a horse having a base portion 24 for steering rotation relative to a complemental upper shoulder portion 25 on the other shell part 22. The upper part of the neck portion 23 terminates in a forward head portion 26, provided with reins 27.

The other shell part 22 is constituted of foreleg extensions 28 from the shoulder portion 25, to extend over the third wheel 19 in advance of the steering post column 15 and two oppositely disposed side body portions 29, to extend down below the single bar 16 between the column 15 and the seat receptacle 20 at the groin of the simulated horse. At the rear the part 22 is constituted of a rump and tail portion, and rear leg extensions 30 reach beyond the receptacle 20 and around the frame branches 18 to have the legs extend out over the axle shaft at a level above the rear wheels. The top of the part 22 is formed to conform to a horse's back with a saddle 31 from the shoulders 25 to the tail area 32. The top of the shoulder area is left open at 33 for seating of the neck thereover.

For steering attachment of the neck to the steering column a cross bar in the form of chrome tubing 34 is horizontally anchored or seated in two opposite side regions on the lower part of the inside of the neck shell and a steering post 35 is centrally fixed to the cross bar 34, with the bar projecting downwardly beyond the base of the neck to enter the opening 33 in the shoulders for insertion in the socket 14 of the steering column 15.

A cross-bar 36 is horizontally anchored or seated at two opposite regions on the inside of the side body portion 29 of the shell part 22, to be just to the rear of the steering column 15, and clamps 37 are fixed to such bar 36 for clamping to the frame at 16.

Figures 2, 3, 4:
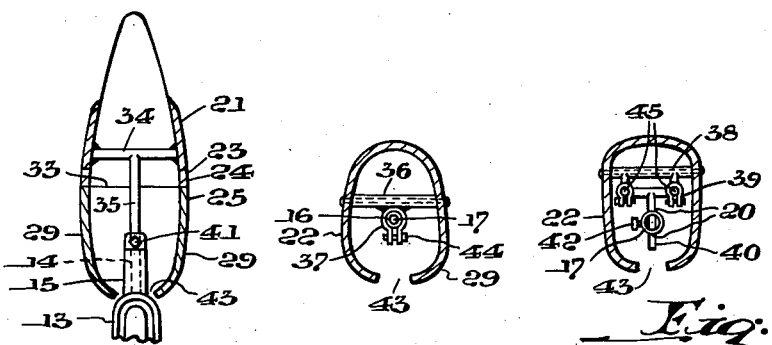
Figure 2 is a vertical cross sectional view taken on the line II—II of Figure 1.
Figure 3 is a similar view taken on the line III—III of Fig. 1.
Figure 4 is a similar view taken in the line IV—IV of Fig. 1.

At the groin area 20 of the shell part 22, a cross bar 38 is horizontally seated or anchored at two opposite regions on the inside of the shell part 22 to be above the receptacle 20 for the seat post. This bar 38 likewise has fixed to it clamps 39 for adjustable attachment to a forwardly extending horizontal seat supporting bar 45 having fixed thereto a seat post 40, which terminates above the bottom of the shell at that region so as to be wholly within the shell when attached to the receptacle 20. The cross bars are welded, as shown in Fig. 3, when the shell body is made of metal, and the cross bars are fixed to the body when made of plastic or wood, by a ¼ inch bolt through a sleeve with acorn nuts as shown in Figs. 3 and 4.

Preferably two parallel bars 45 and clamps 39 are used to provide a double seat to prevent turning of the shell 22 relative to the seat post 40.

In operation the set screws 41, 42 are loosened, and the conventional steering mechanism and seating mechanism for tricycles of this type are lifted out of the socket 14 and the receptacle 20. The horse body part 22 is then inserted over the frame, through the downwardly open slot 43 and the seat post 40 clamped in the receptacle 20 by the screw 42 and the clamps fastened to the frame by a bolt 44. The head part 21 is then set on the body part 22, by positioning the base of the neck 23 over the shoulders 25 with the steering post 34 in the usual handle bar socket 14, and then fastened there, using the same set screw 41. The animal is now ready to ride by having a child sit in the saddle and pedal the third wheel while steering by turning the horse's head with the reins.

The invention as hereinabove set forth is embodied in a particular form of construction, but may be variously embodied within the scope of the claims as hereinafter made.

I claim:

1. An adapter mechanism for converting a three wheel steerable velocipede of the type comprising a frame, a steering column, and a seat post receptacle, into a simulation of a steerable animal, comprising: a stationary main body member constituted of a downwardly open hollow shell insertable over a steering column, seat post receptacle, and frame of a said three wheel velocipede, said shell being composed of oppositely disposed side portions in simulation of the sides of a horse to extend along opposite sides of the frame from the steering column to the seat post receptacle, a breast portion to extend around the front of the steering column, a rump portion to extend around the rear of the seat post receptacle, to completely obscure the frame, seat post receptacle and steering mechanism of the velocipede, foreleg and rear leg portions to extend beyond the steering column and the seat post receptacle on the frame, and a top portion in simulation of the shoulder to tail part of the back of a horse to extend above the frame from the rear of the steering column to the rear of the receptacle for the seat post, leaving an access opening above the steering column; a separable head member rotatably mountable over the access opening on the main body member and constituted of a downwardly open hollow shell composed of a neck portion and a head portion in simulation of a horse head and neck; a saddle part on said top portion; reins connected with said head for turning of the neck relative to the shoulders on said main body member; a cross bar secured inside said neck in position above the base of the shell thereof; a steering post secured to the cross bar and extending beyond the base of the neck shell to project through the access opening for detachably securing of the steering post in the steering column of the velocipede frame; a cross bar secured on the inside of the main body member at a forward region close to the shoulder portion thereof and provided with clamps for detachable connection to the forepart of the frame of the vehicle to the rear of the steering column; and a cross-bar secured inside the groin region of the main body member in position above the base of its shell to be above the seat post receptacle when over said frame, a plurality of adjustable clamps attached to said cross-bar, parallel supporting arms secured in said clamps, and a post supporting said arms, all in position above the base of the shell of the main body member, for seating the post in the seat post receptacle in the velocipede frame.

2. An adapter mechanism for converting a three wheel steerable velocipede of the type comprising a frame, a steering column, and a seat post receptacle, into a simulation of a steerable animal, comprising: a stationary main body member constituted of a downwardly open hollow shell insertable over a steering column, seat post receptacle, and frame of a said three wheel velocipede, shell being composed of oppositely disposed side portions in simulation of the sides of a horizontally disposed vertebrate animal to extend along opposite sides of the frame from the steering column to the seat post receptacle, a breast portion to extend around the front of the steering column, a rump portion to extend around the rear of the seat post receptacle, to completely obscure the frame, seat post receptacle and steering mechanism of the velocipede; foreleg and rear leg portions to extend beyond the steering column and the seat post receptacle on the frame, and a top portion in simulation of the shoulder to tail part of the back of the horizontally disposed vertebrate animal, to extend above the frame from the rear of the steering column to the rear of the receptacle for the seat post, leaving an access opening above the steering column; a separable head member rotatably mountable over the access opening on the main body member and constituted of a downwardly open hollow shell composed of a neck portion and head portion in simulation of the head and neck of the horizontally disposed vertebrate animal; a saddle part on said top portion; reins connected with said head for turning the neck relative to the shoulders on said main body; a cross bar secured inside said neck in position above the base of the shell thereof, a steering post secured to the cross bar and extending beyond the base of the neck shell to project through the access opening for detachably securing of the steering post in the steering column of the velocipede frame; a cross bar secured on the inside of the main body member at a forward region close to the shoulder portion thereof and provided with clamps for detachable connection to the forepart of the frame of the vehicle to the rear of the steering column; and a cross-bar secured inside the groin region of the main body member in position above the base of its shell to be above the seat post receptacle when over said frame; a clamp attached to said cross-bar, a supporting arm secured in said clamp, and a post supporting said arm, all in position above the base of the shell of the main body member, for seating the post in the seat post receptacle in the velocipede frame.

3. An adapter mechanism for converting a three wheel steerable velocipede of the type comprising a frame, a steering column, and a seat post receptacle, into a simulation of a steerable animal, comprising: a stationary main body member constituted of a downwardly open hollow shell insertable over a steering column, seat post receptacle, and frame of a said three wheel velocipede, said shell being composed of oppositely disposed side portions in simulation of the sides of a horizontally disposed vertebrate animal to extend along opposite sides of the frame from the steering column to the seat post receptacle, a breast portion to extend around the front of the steering column, a rump portion to extend around the rear of the seat post receptacle, to completely obscure the frame, seat post receptacle and steering mechanism of the velocipede, foreleg and rear leg portions to extend beyond the steering column and the seat post receptacle on the frame, and a top portion in simulation of the shoulder to tail part of the back of the horizontally disposed vertebrate animal, to extend above the frame from the rear of the steering column to the rear of the receptacle for the seat post, leaving an access opening above the steering column; a separable head member rotatably mountable over the access opening on the main body member and constituted of a downwardly open hollow shell composed of a neck portion and head portion in simulation of the head and neck of the horizontally disposed vertebrate animal; a cross bar secured inside said neck in position above the base of the shell thereof, a steering post secured to the cross bar and extending beyond the base of the neck shell to project through the access opening for detachably securing of the steering post in the steering column of the velocipede frame; a cross bar secured on the inside of the main body member at a forward region close to the shoulder portion thereof and provided with clamps for detachable connection to the forepart of the frame of the vehicle to the rear of the steering column; and a cross-bar secured inside the groin region of the main body member in position above the base of its shell to be above the seat post receptacle when over said frame; a clamp attached to said cross-bar, a supporting arm secured in said clamp, and a post supporting said arm, all in position above the base of the shell of the main body member, for seating the post in the seat post receptacle in the velocipede frame.

4. An adapter mechanism for converting a steerable tricycle of the type comprising a frame, a steering column, and a seat post receptacle, into a simulation of a horse comprising: a downwardly opening hollow shell body in simulation of the outlines of a neckless body of a horse having attaching means on the interior of the shell in the region of the shoulders of the simulated body of the horse for removable attachment to a portion of a said tricycle frame to the rear of its juncture with a steering column on the frame, and attachment means on the interior of the shell body in the region of the groin of the simulated horse body comprising a cross-bar with clamps attached to two parallel arms with a post for mounting of the post in a seat post receptacle in the frame of a said tricycle interchangeably with a conventional seat post and seat on a tricycle; and a downwardly opening hollow steering shell in simulation of the neck and head of a horse with steering means on the interior of the steering shell for mounting in the steering column of a said tricycle interchangeably with a conventional steering mechanism in such steering column, said steering shell having the neck thereof rotatably mounted over the shoulder portion of the aforesaid shell body for steering of a said tricycle.

References Cited in the file of this patent
UNITED STATES PATENTS 2,044,889 Ralston _____ June 23, 1936
2,796,265 Fields et al. _____ June 17, 1957